(12) United States Patent
Kim

(10) Patent No.: US 11,593,033 B2
(45) Date of Patent: *Feb. 28, 2023

(54) ELECTRONIC DEVICE FOR COMMUNICATING WITH HOST AND OPERATING METHOD OF THE ELECTRONIC DEVICE

(71) Applicant: SAMSUNG ELECTRONICS CO., LTD., Suwon-si (KR)

(72) Inventor: Ji-Hyun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/499,512

(22) Filed: Oct. 12, 2021

(65) Prior Publication Data

US 2022/0066702 A1 Mar. 3, 2022

Related U.S. Application Data

(63) Continuation of application No. 16/671,542, filed on Nov. 1, 2019, now Pat. No. 11,175,855.

(30) Foreign Application Priority Data

Nov. 9, 2018 (KR) .......................... 10-2018-0137606

(51) Int. Cl.
*G06F 13/38* (2006.01)
*G06F 3/06* (2006.01)

(52) U.S. Cl.
CPC .......... *G06F 3/0659* (2013.01); *G06F 3/0607* (2013.01); *G06F 13/382* (2013.01); *G06F 3/0679* (2013.01); *G06F 2213/0028* (2013.01)

(58) Field of Classification Search
CPC .... G06F 3/0659; G06F 3/0607; G06F 3/0679; G06F 13/382; G06F 2213/0028
USPC ............................................... 711/154
See application file for complete search history.

(56) References Cited

U.S. PATENT DOCUMENTS

| | | | |
|---|---|---|---|
| 7,529,877 B2 | 5/2009 | Bashford et al. | |
| 7,664,896 B2 | 2/2010 | Galloway | |
| 8,099,539 B2 | 1/2012 | Marulkar et al. | |
| 9,026,702 B2 | 5/2015 | More et al. | |
| 9,158,461 B1 * | 10/2015 | Lee ........................ | G06F 3/0611 |
| 9,270,756 B2 | 2/2016 | More et al. | |
| 9,436,412 B2 | 9/2016 | More et al. | |
| 9,442,657 B2 | 9/2016 | Okita | |
| 2005/0076162 A1 | 4/2005 | Tamura et al. | |

(Continued)

*Primary Examiner* — Christopher B Shin
(74) *Attorney, Agent, or Firm* — Volentine, Whitt & Francos, PLLC

(57) ABSTRACT

An electronic device configured to communicate with a host includes: a detecting logic configured to receive an initial command signal and a first completion signal according to the initial command signal after a connection of the host to the electronic device is established, and transmit a detection signal based on a signal transmission policy of the host that has been detected based on the initial command signal and the first completion signal; and a transmitting logic configured to transmit a second completion signal to the host based on the detection signal, wherein the signal transmission policy is different depending on whether the first completion signal is received in response to the second completion signal.

20 Claims, 16 Drawing Sheets

(56) References Cited

U.S. PATENT DOCUMENTS

| | | |
|---|---|---|
| 2007/0079208 A1 | 4/2007 | Shvodian |
| 2010/0299435 A1* | 11/2010 | Goto .................. H04L 63/0236 |
| | | 709/225 |
| 2012/0032528 A1 | 2/2012 | Toyama et al. |
| 2012/0151101 A1 | 6/2012 | Matsuo et al. |
| 2015/0100745 A1* | 4/2015 | Konda .................. G06F 3/0659 |
| | | 711/154 |
| 2016/0378971 A1 | 12/2016 | Dunstan |
| 2017/0262230 A1 | 9/2017 | Myouga |
| 2018/0074751 A1* | 3/2018 | Ngu .................... G06F 3/0659 |

\* cited by examiner

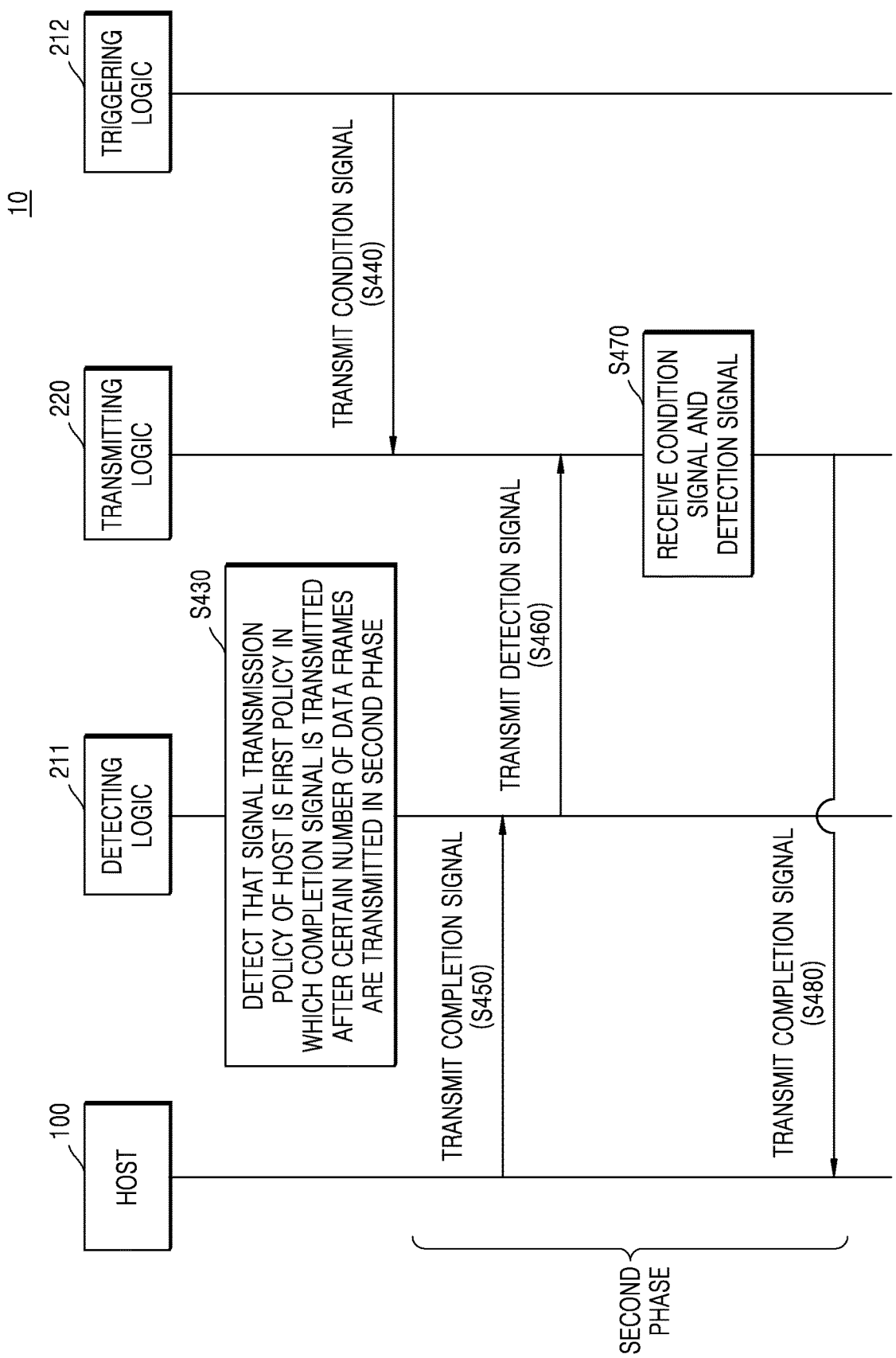

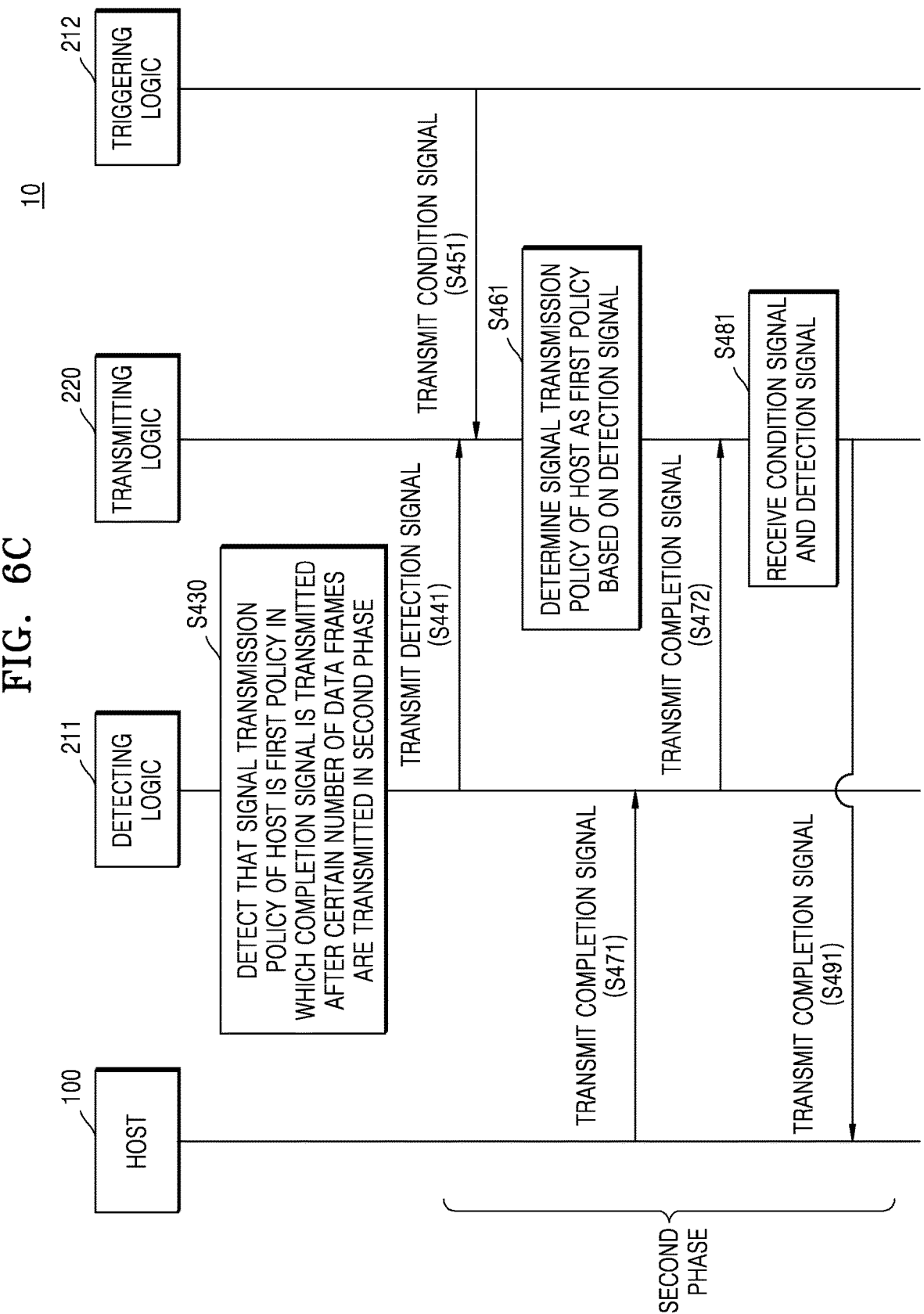

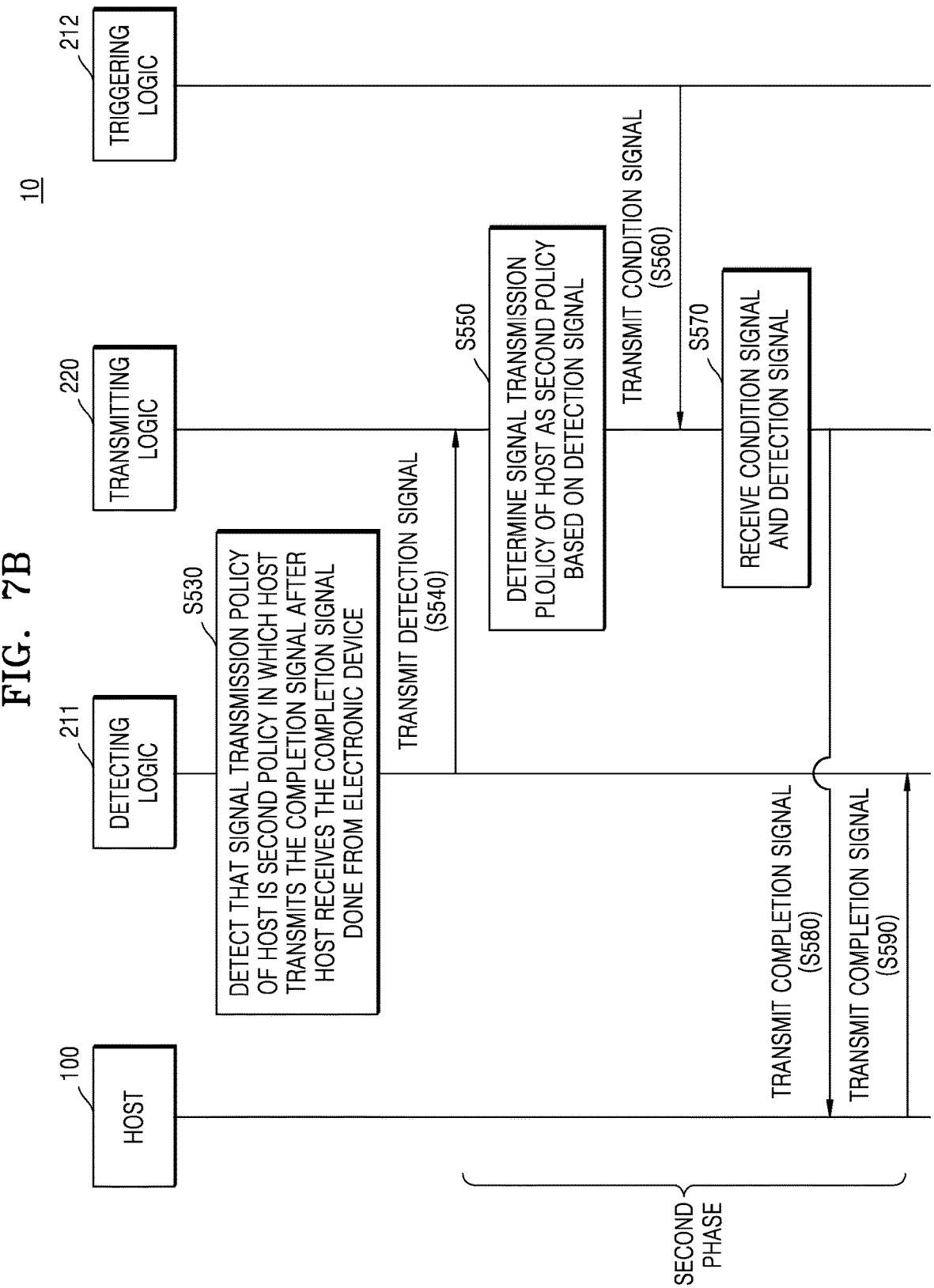

ELECTRONIC DEVICE FOR COMMUNICATING WITH HOST AND OPERATING METHOD OF THE ELECTRONIC DEVICE

CROSS-REFERENCE TO RELATED APPLICATION

This is a Continuation of U.S. application Ser. No. 16/671,542, filed Nov. 1, 2019, which issued as U.S. Pat. No. 11,175,855 on Nov. 16, 2021, and a claim of priority under 35 U.S.C. § 119 is made to Korean Patent Application No. 10-2018-0137606, filed on Nov. 9, 2018, in the Korean Intellectual Property Office, the disclosure of which is incorporated herein in its entirety by reference.

BACKGROUND

The inventive concept relates to an electronic device communicating with a host, and more particularly, an electronic device performing bi-directional communication with a host, and an operating method of the electronic device.

As electronic technology has developed, the amount of information sent by electronic devices has rapidly increased, and research into an interface for data communication has been conducted in various fields such as a processing unit, a memory, and a communication device for efficiently performing data communication. However, in some conventional interfaces, the efficiency of data communication has been reduced due to the establishment of half-duplex connection for various reasons.

SUMMARY

The inventive concept provides an electronic device capable of communicating with a host by transmitting a completion signal to the host as a signal transmission policy is detected, and an operating method of the electronic device.

According to an aspect of the inventive concept, there is provided an electronic device configured to communicate with a host, the electronic device including: a detecting logic configured to receive an initial command signal and a first completion signal corresponding to the initial command signal after a connection of the host to the electronic device is established, and further configured to transmit a detection signal based on a signal transmission policy of the host that has been detected based on the initial command signal and the first completion signal; and a transmitting logic configured to transmit a second completion signal to the host based on the detection signal, wherein the signal transmission policy is different depending on whether the first completion signal is received in response to the second completion signal.

According to another aspect of the inventive concept, there is provided an operation method of an electronic device configured to communicate with a host, the operation method including: in a first phase, detecting a signal transmission policy of the host as a first policy in which the host transmits a first completion signal after a certain number of data frames has been transmitted; in a second phase, transmitting and receiving at least one of the data frames; and in the second phase, transmitting a second completion signal to the host when the first completion signal is received from the host according to detection of the signal transmission policy, wherein the first phase includes transmitting or receiving a command to transmit and receive the at least one of the data frames in the second phase.

According to another aspect of the inventive concept, there is provided an operation method of a target device configured to perform communication via an initiator and a serial attached small computer system interface (SAS), the operation method including: transmitting a connection request signal; receiving an initial command signal after a connection response signal is received from the initiator; when a first completion signal corresponding to the initial command signal is received from the initiator within a specified time period, transmitting a second completion signal to the initiator in response to the first completion signal corresponding to the initial command signal; and when the first completion signal corresponding to the initial command signal is not received from the initiator within the specified time period, transmitting the second completion signal to the initiator after the specified time period expires.

Another to another aspect of the inventive concept, there is provided a device, comprising: a first logic configured to receive an initial command signal, and a first completion signal corresponding to the initial command signal, after a connection of the device a host is established, wherein the first logic is further configured to detect, based on the initial command signal and the first completion signal, whether a signal transmission policy of the host is a first policy or a second policy, wherein the first logic is further configured to transmit a detection signal based on the detected signal transmission policy of the host; and a second logic configured to receive the detection signal and to transmit a second completion signal to the host based on the detection signal, wherein the first policy is a policy wherein the host transmits the first completion signal to the device after a plurality of data frames are transmitted from the host to the device, and wherein the second policy is a policy wherein the host transmits the first completion signal to the device after the host receives the second completion signal from the device.

BRIEF DESCRIPTION OF THE DRAWINGS

Embodiments of the inventive concept will be more clearly understood from the following detailed description taken in conjunction with the accompanying drawings.

FIG. 6B is a sequence diagram for explaining an operation of an electronic device transmitting a completion signal according to a detected first policy, according to an embodiment, and FIG. 6C is a sequence diagram for explaining an operation of an electronic device transmitting a completion signal after determining a signal transmission policy of a host as a first policy, according to an embodiment.

FIG. 7B is a sequence diagram for explaining an operation of an electronic system transmitting a completion signal, according to the detected second policy, according to an embodiment.

DETAILED DESCRIPTION OF THE EMBODIMENTS

Hereinafter, embodiments of the inventive concept are described in detail with reference to the accompanying drawings.

Figure 1:
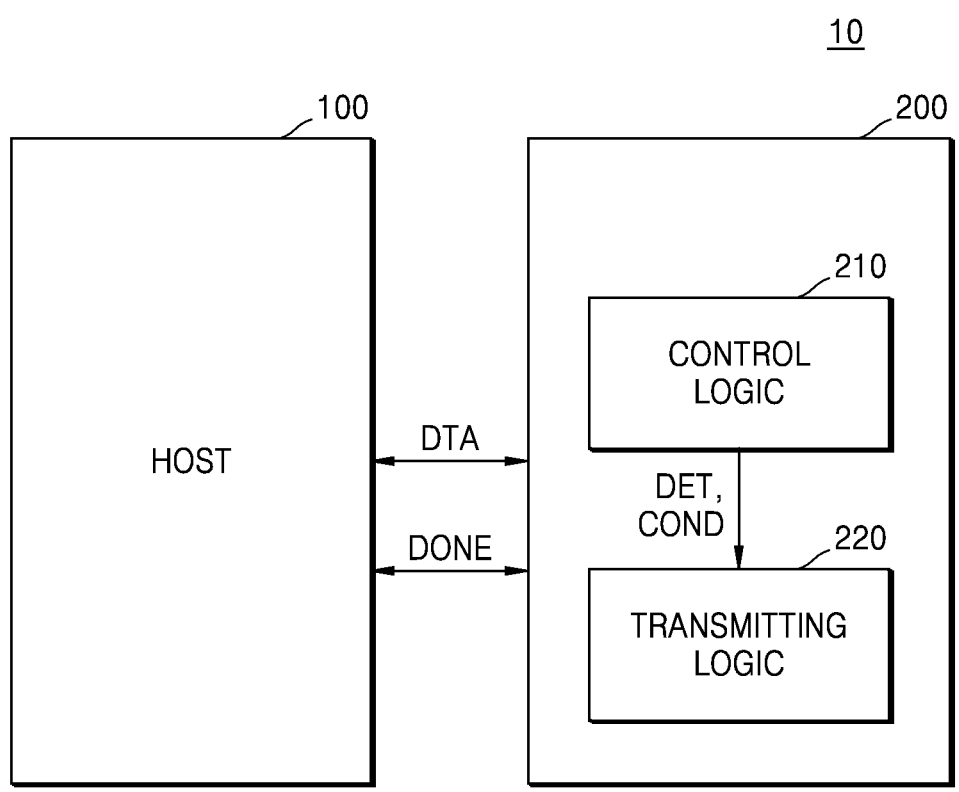
FIG. 1 is a block diagram illustrating a memory system according to an embodiment.

FIG. 1 is a block diagram illustrating an electronic system 10 according to an embodiment.

Electronic system 10 according to an embodiment may include a host 100 and an electronic device 200, and electronic device 200 may include a control logic 210 and a transmitting logic 220. Here and throughout the specification and the claims to follow, logic means hardware, software and combination thereof capable performing logical operations. In various embodiments the logic may comprise a logic circuit (e.g., a gate array) and/or a processor (e.g., a central processing unit, an application specific integrated circuit, a digital signal processor, etc.) configured to perform logical operations in response to executable instructions stored in a memory device.

Host 100 and electronic device 200 according to an embodiment may establish a connection to transmit and receive data DTA. After the connection of host 100 to electronic device 200 is established and at least one of host 100 and electronic device 200 transmits and receives all the data DTA, a completion signal DONE may be sent and received. The data DTA may be sent in units of frames, bits, bytes, etc. The completion signal DONE is a kind of a response signal, and for example, when electronic device 200 transmits data DTA, host 100 may transmit a response signal, which may include the completion signal DONE. In other words, the response signal may include alone or more signals, not limited to the completion signal DONE, that are all sent as a response by one of the devices receiving the data DTA.

The completion signal DONE according to an embodiment may be a signal for informing the other party that a portion or all of the communication process has been performed. For example, the completion signal DONE may be a signal to inform electronic device 200 of a fact that there is no data DTA to be sent by host 100 after host 100 transmits all of the data DTA required to be sent. However, hereinafter, the completion signal DONE may be referred to as a first completion signal and a second completion signal. The first completion signal may be a completion signal DONE sent from host 100 to electronic device 200, and the second completion signal may be a completion signal DONE sent from electronic device 200 to host 100. In other words, the first completion signal and the second completion signal may be the same as a signal indicating that all of the data DTA has been sent, except that only the transmitting points are different between the first completion signal and the second completion signal.

According to an embodiment, after host 100 or electronic device 200 transmits the completion signal DONE to the other party, and transmission of the completion signal DONE is finished, further transmission of the data DTA may not be possible. For example, even when a situation occurs in which host 100 should transmit other data DTA, due to various causes, after the completion signal DONE is sent, since the completion signal DONE has been sent to electronic device 200, the other data DTA may not be sent. In this case, electronic system 10 may be in a half-duplex communication state in which only electronic device 200 is capable of transmitting the data DTA. In the case where electronic system 10 transmits and receives the data DTA in the half-duplex communication, the amount of data transmission may be reduced. Thus, electronic system 10 according to embodiments described herein is provided to increase a duration time of full duplex communication by reducing the duration of the half-duplex communication.

Electronic device 200 according to an embodiment may receive one or more signals after the connection with host 100 is established, detect a signal transmission policy of host 100 based on the received signal(s), and transmit the completion signal DONE to host 100 according to the detected signal transmission policy. Control logic 210 may receive an initial command signal and the completion signal DONE according to the initial command signal, detect the signal transmission policy, and according to the detected signal transmission policy, may transmit a detection signal DET to transmitting logic 220. The detection signal DET may include a signal indicating the signal transmission policy of host 100. Transmitting logic 220 may transmit the completion signal DONE to host 100 based on the received detection signal DET, and complete a series of data transmission processes performed by electronic device 200.

The signal transmission policy may denote a policy that specifies a method in which host 100 transmits a signal to electronic device 200. For data communication to be performed by electronic system 10, host 100 and electronic device 200 may transmit and receive various signals including the data DTA and the completion signal DONE. For example, the signal transmission policy may include a policy defining a time point or a period of time at or during which host 100 transmits the completion signal DONE to electronic device 200, characteristics of the completion signal DONE, etc.

The initial command signal may denote a command signal that host 100 or the electronic device 200 initially transmits to the other party after the connection of host 100 to electronic device 200 is established. The command signal may include various instructions, for example, a command for requesting information such as the size, capacity, and device information (for example, device type) of electronic device 200 for smooth communication. According to an embodiment, the initial command signal may be used to detect the signal transmission policy of host 100. However, the embodiment is not limited thereto. According to an embodiment, host 100 may detect the signal transmission policy of electronic device 200, and in this case, the initial command signal sent by electronic device 200 to host 100 may be used. A method of detecting the signal transmission policy is described later.

According to an embodiment, electronic device 200 may extend the duration time of the full-duplex communication by varying the manner in which the completion signal DONE to be sent to host 100 is sent, according to the signal transmission policy of host 100.

According to one embodiment, when host 100 transmits a completion signal DONE after transmitting a certain number of data frames, electronic device 200 may detect the signal transmission policy of host 100 as a first policy. When the signal transmission policy of the host is detected as the first policy, and electronic device 200 first transmits the completion signal DONE before receiving the completion signal DONE from host 100, then host 100 and electronic device 200 may be in a half-duplex communication state in which only host 100 performs communication. Thus, to reduce the period of time when host 100 and electronic device 200 are in a half-duplex communication state, electronic device 200 may transmit the completion signal DONE only after receiving the completion signal DONE from host 100.

According to an embodiment, when host 100 transmits the completion signal DONE to electronic device 200 under a precondition that host 100 has received the completion signal DONE from electronic device 200, electronic device 200 may detect the signal transmission policy of host 100 as a second policy. In the case where the signal transmission policy is detected as the second policy and electronic device 200 does not transmit the completion signal DONE, unless the connection of host 100 to electronic device 200 is forcibly terminated by a time-out, host 100 may not transmit the completion signal DONE to electronic device 200. In other words, a communication connection time between host 100 and electronic device 200 may be excessively increased. Thus, when electronic device 200 detects the signaling policy of host 100 as the second policy, and a triggering logic (for example, 212 in FIG. 2) inside electronic device 200 transmits a condition signal COND, electronic device 200 may transmit the completion signal DONE to host 100. In other words, independently of whether electronic device has received the completion signal DONE from host 100, electronic device 200 may transmit the completion signal DONE to host 100.

As described above, according to an embodiment, by performing communication in a variable manner between host 100 and electronic device 200 according to the signal transmission policy of host 100, the duration time of the full duplex communication may be efficiently increased and the efficiency of data transmission may be increased. However, even though a method of transmitting the completion signal DONE by electronic device 200 according to the signal transmission policy of host 100 is described below, the method may also be applied to a method of transmitting the completion signal DONE by host 100 according to the signal transmission policy of electronic device 200. In other words, the technical idea may be applicable even though host 100 and electronic device 200 is changed.

Electronic system 10 according to an embodiment may comprise various types of electronic systems for exchanging various data. For example, electronic system 10 may comprise an electronic system that communicates via a serial attached small computer system interface (SCSI) SAS. In this case, host 100 and electronic device 200 may be end devices including an initiator and a target, respectively. For example, when host 100 is an initiator and electronic device 200 is a target, host 100 may include a host bus adapter (HBA), and electronic device 200 may be implemented as various storage devices. For example, the storage device may be implemented as a nonvolatile memory, a volatile memory, a flash memory, a solid state drive (SSD), a hard disk drive (HDD), etc.

Electronic system 10 according to an embodiment may not be limited to communication being performed by only SAS, and may comprise an electronic system in which communication is performed via various interfaces. According to an embodiment, electronic system 10 may be implemented as a server device and a client device which transmit data by using wired or wireless communication. For example, electronic system 10 may utilize peripheral component interconnect (PCIe), remote direct memory access (RDMA), serial advanced technology attachment (SATA), a fiber channel, or a nonvolatile memory express (NVMe), or a universal interface such as Ethernet or universal serial bus (USB). Alternatively, electronic system 10 may perform communication via a near-field and a long-distance communication interface, and may follow communication interfaces through various methods such as Institute of Electrical and Electronics Engineers (IEEE), Zigbee, 3rd generation (3G), 3rd generation partnership project (3GPP), long term evolution (LTE), 5th generation (5G), wireless fidelity (WiFi), Bluetooth, near field communication (NFC), and infrared ray (IR)

Figure 2:
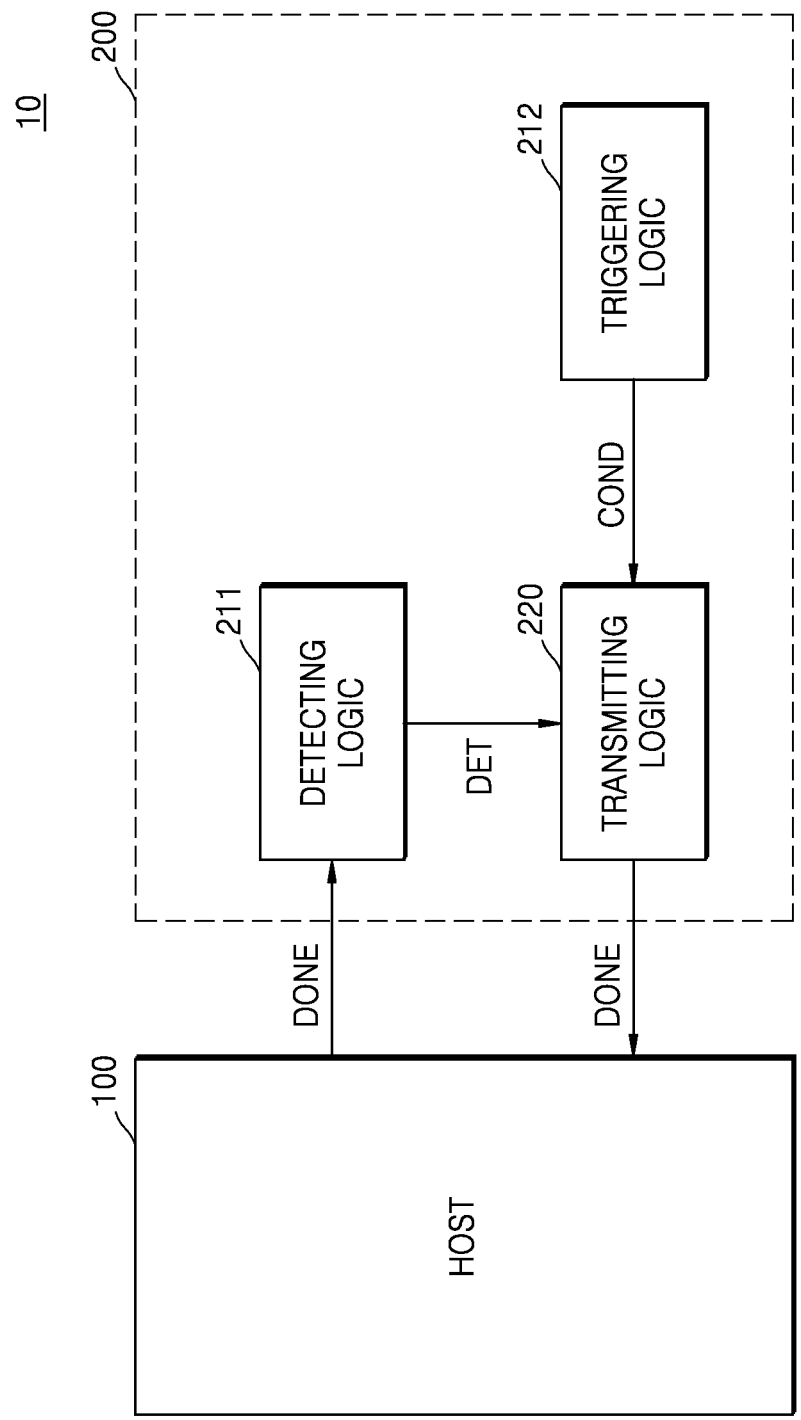
FIG. 2 is a block diagram illustrating a memory system according to an embodiment.

FIG. 2 is a block diagram illustrating electronic system 10 according to an embodiment.

Electronic system 10 according to an embodiment may include a host 100 and an electronic device 200, and electronic device 200 may include a control logic 210 and a transmitting logic 220. Control logic 210 may include a detecting logic 211 and a triggering logic 212.

Detecting logic 211 according to an embodiment may receive the completion signal DONE from host 100, and transmitting logic 220 may transmit the completion signal DONE to host 100. For example, an additional interface for transmitting or receiving signals may be further included between detecting logic 211 and host 100, as well as between transmitting logic 220 and host 100.

Detecting logic 211 may receive at least one of the completion signal DONE, the data DTA, and the initial command signal from host 100.

According to an embodiment, detecting logic 211 may receive the initial command signal, which is a first received signal after the connection of host 100 to electronic device 200 is established. In addition, detecting logic 211 may receive the completion signal DONE according to the initial command signal after electronic system 10 performs a series of operations according to the initial command signal. Host 100 and electronic device 200 may exchange various signals and establish a mutual connection for data communication.

According to an embodiment, in a first phase detecting logic 211 may receive the initial command signal and the completion signal DONE according to the initial command signal. For example, the initial command signal may be a signal for requesting the capacity of electronic device 200, and the completion signal DONE, in response to the initial command signal, may denote that host 100 has completed an operation of requesting the capacity of electronic device 200. In other words, the first phase may denote a phase in which electronic system 10 is prepared to smoothly communicate data.

According to an embodiment, in a second phase, detecting logic 211 may receive the data DTA and the completion signal according to the data DTA. For example, the completion signal DONE may be received after a certain number of data frames from host 100. Here, the completion signal DONE may be a signal that host 100 has completed an operation of transmitting the certain number of data frames. In other words, the second phase may denote a phase in which electronic system 10 transmits and receives data.

According to an embodiment, detecting logic 211 may detect the signal transmission policy of host 100 based on the initial command signal received from host 100 in the first phase and the completion signal DONE according to the initial command signal, and detecting logic 211 may transmit a detection signal DET to transmitting logic 220 according to the signal transmission policy of host 100.

According to an embodiment, transmitting logic 220 may transmit the completion signal DONE to host 100 based on the detection signal DET.

For example, transmitting logic 220 may transmit the completion signal DONE to host 100 when the detection signal DET is received. Transmitting logic 220 may reserve transmitting the completion signal DONE to host 100 until the detection signal DET is received, even though transmitting logic 220 is in a state capable of transmitting the completion signal DONE to host 100. For example, even after electronic device 200 transmits all the data DTA to be transmitted to host 100, electronic device 200 may transmit additionally the data DTA due to various causes, and thus, electronic device 200 may refrain from transmitting the completion signal DONE to host 100 until the detection signal DET is received. In other words, the detection signal DET may be a signal satisfying a condition that transmitting logic 220 sends the completion signal DONE to host 100.

As another example, transmitting logic 220 may determine the signaling policy of host 100 when the detection signal DET is received. In other words, the detection signal DET may include information about the signal transmission policy of host 100, and transmitting logic 220 may determine the signal transmission policy of host 100 based on the received detection signal DET. For example, transmitting logic 220 may determine the signal transmission policy of host 100 as either the first policy or the second policy based on the received detection signal DET. Next, when transmitting logic 220 determines the signal transmission policy of host 100 as the first policy, transmitting logic 220 may transmit the completion signal DONE to host 100, and when transmitting logic 220 determines the signal transmission policy of host 100 as the second policy, transmitting logic 220 may transmit the completion signal DONE to host 100 after receiving the completion signal DONE from host 100.

According to an embodiment, transmitting logic 220 may transmit the completion signal DONE to host 100 based on the detection signal DET and a condition signal COND. transmitting logic 220 may transmit the completion signal DONE to host 100 in response to receiving the detection signal DET and the condition signal COND. When transmitting logic 220 receives the detection signal DET and the condition signal COND, electronic device 200 may determine that all the conditions for transmitting the completion signal DONE to host 100 are satisfied and transmit the completion signal DONE to host 100. According to an embodiment, transmitting logic 220 may generate the completion signal DONE, be activated to transmit the completion signal DONE upon receipt of the detecting signal DET and the condition signal COND, and then transmit the completion signal DONE to host 100.

According to an embodiment, triggering logic 212 may transmit the condition signal COND to transmitting logic 220. According to an embodiment, triggering logic 212 may send the different condition signal COND to transmitting logic 220 depending on whether there is a remaining data frame to be transmitted by electronic device 200 to host 100. This is described below with reference to FIG. 3.

Figure 3:
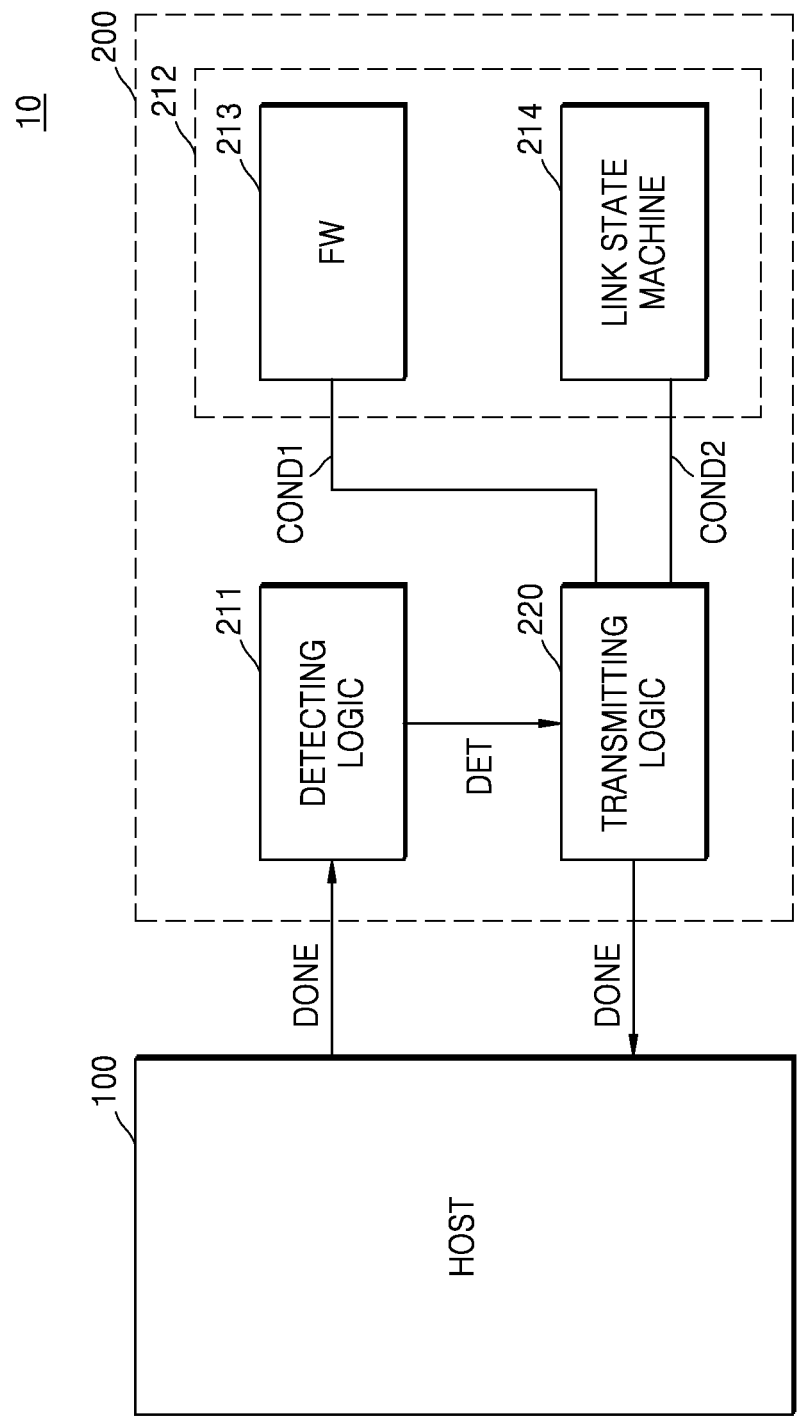
FIG. 3 is a block diagram illustrating a memory system according to an embodiment.

FIG. 3 is a block diagram illustrating electronic system 10 according to an embodiment.

Electronic system 10 according to an embodiment may include host 100 and electronic device 200, and electronic device 200 may include control logic 210 and transmitting logic 220. Control logic 210 may include detecting logic 211 and triggering logic 212. Triggering logic 212 may include a first sub-triggering logic 213 and a second sub-triggering logic 214.

According to an embodiment, triggering logic 212 may transmit at least one of a first condition signal COND1 and a second condition signal COND2 to transmitting logic 220. The condition signal COND may include the first condition signal COND1 and the second condition signal COND2. The first condition signal COND1 and the second condition signal COND2 are required conditions for transmitting logic 220 to transmit the completion signal DONE to host 100. In other words, as described above, after transmitting logic 220 receives at least one of the first condition signal COND1 and the second condition signal COND2, and the detection signal DET, transmitting logic 220 may transmit the completion signal DONE to host 100.

According to an embodiment, the first condition signal COND1 and the second condition signal COND2 may be signals that are generated differently depending on whether electronic device 200 has remaining data to be transmitted to host 100.

According to an embodiment, when first sub-triggering logic 213 is required to transmit the completion signal DONE to host 100 even though electronic device 200 includes remaining data DTA to be transmitted therein, first sub-triggering logic 213 may transmit the first condition signal COND1 to transmitting logic 220 to request transmitting logic 220 to transmit the completion signal DONE. When second sub-triggering logic 214 is required to transmit the completion signal DONE because there remains no data DTA to be transmitted by electronic device 200, second sub-triggering logic 214 may transmit the second condition signal COND2 to transmitting logic 220 and request transmitting logic 220 to transmit the completion signal DONE. For example, first sub-triggering logic 213 may be implemented with firmware FW and second sub-triggering logic 214 may be implemented with a link state machine.

Figure 4:
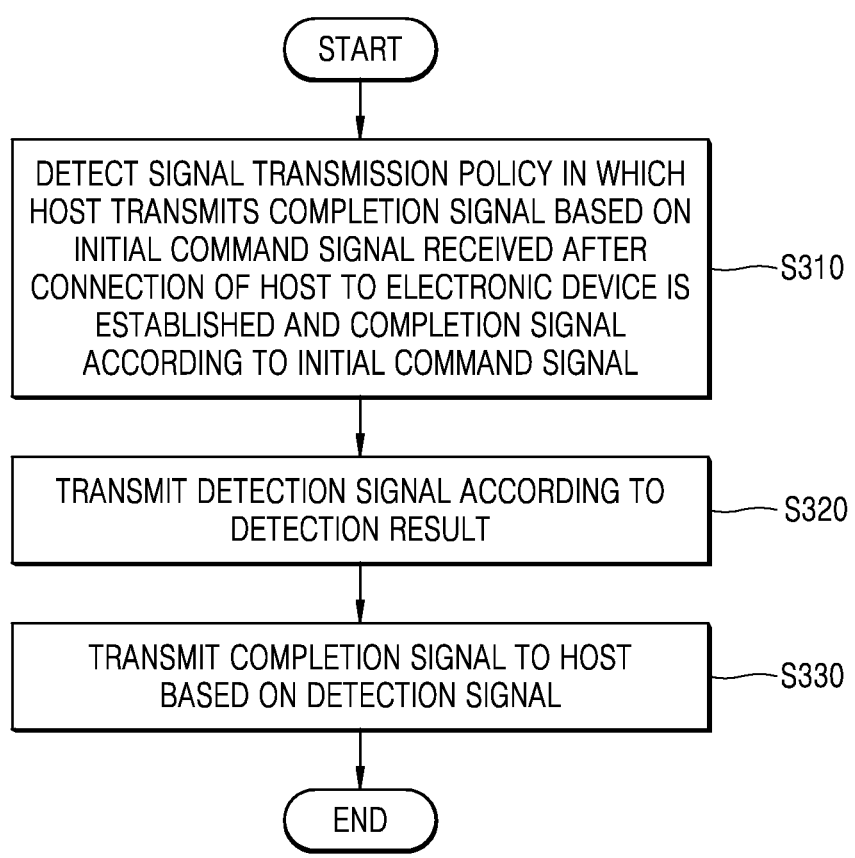
FIG. 4 is a flowchart of an operation method of an electronic device, according to an embodiment.

FIG. 4 is a flowchart of an operation method of electronic device 200 according to an embodiment.

A signal transition policy with which host 100 transmits the completion signal DONE may be detected, based on the initial command signal that is received after establishment of a connection of host 100 to electronic device 200, and the completion signal DONE according to the initial command signal (S310) is also received. This is described in detail with reference to FIGS. 6A and 7A.

Detecting logic 211 included in electronic device 200 may transmit the detection signal DET to transmitting logic 220 according to a detection result (S320). For example, the detection signal DET may be a required signal for transmitting logic 220 to transmit the completion signal DONE to host 100, and the detection signal DET may be a signal including information about the signal transmission policy of host 100.

Transmitting logic 220 included in electronic device 200 may transmit the completion signal DONE to host 100 based on the detection signal DET (S330). According to an embodiment, transmitting logic 220 may treat the detection signal DET as a required condition of the completion signal DONE by transmitting the completion signal DONE to host 100 in response to receipt of the detection signal DET. According to another embodiment, transmitting logic 220 may determine the signal transmission policy of host 100 based on information about the signal transmission policy of host 100 included in the detection signal DET after receiving the detection signal DET. For example, when the signal transmission policy of host 100 is determined as the first policy, transmitting logic 220 may transmit the completion signal DONE to host 100, and when the signal transmission policy of host 100 is determined as the second policy, transmitting logic 220 may transmit the completion signal DONE to host 100 after receiving the detection signal DET and thereafter receiving the completion signal DONE from host 100.

Figure 5:
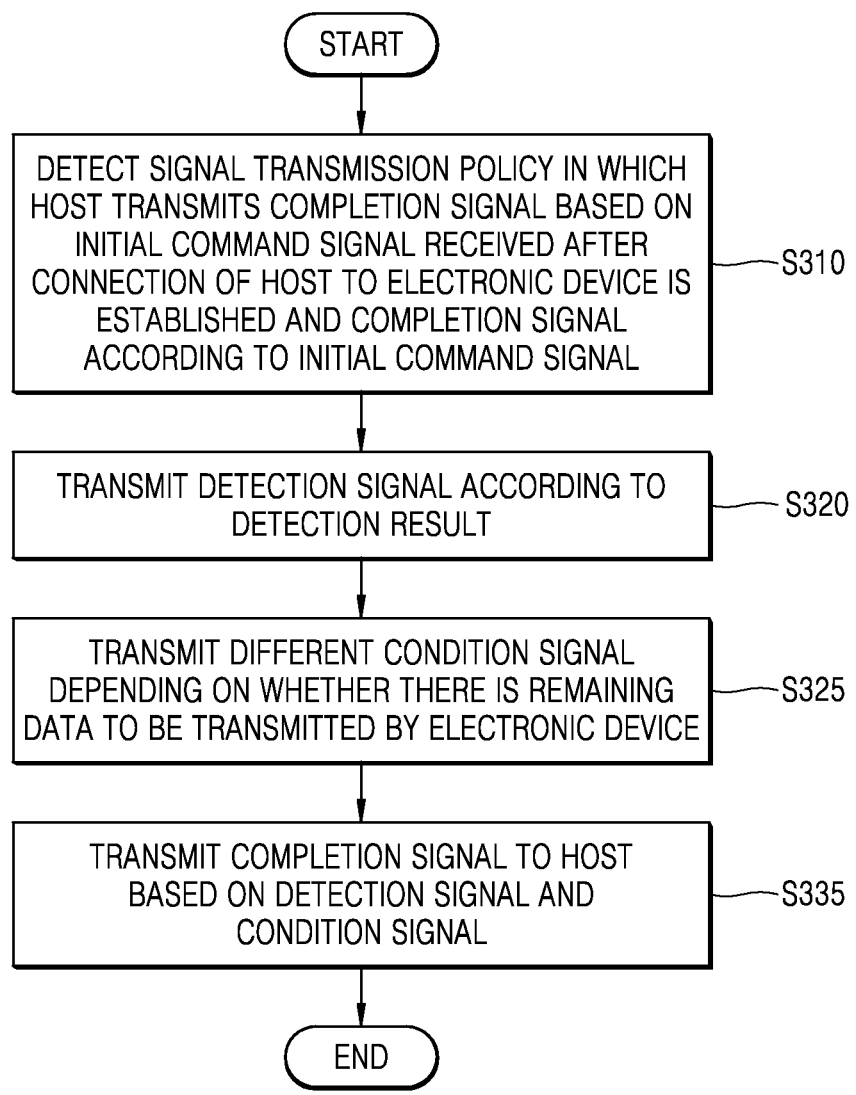
FIG. 5 is a flowchart of an operation method of an electronic device, according to an embodiment.

FIG. 5 is a flowchart of an operation method of electronic device 200, according to an embodiment. Descriptions already given of operations S310 and S320 with reference to FIG. 4 are omitted.

Triggering logic 212 included in electronic device 200 may transmit different condition signals COND depending on whether electronic device 200 includes remaining data to be transmitted to host 100 (S325). For example, when there is remaining data to be transmitted by electronic device 200, first sub-triggering logic 213 may transmit the first condition signal COND1, and when there is no remaining data to be transmitted by electronic device 200, second sub-triggering logic 214 may transmit the second condition signal COND2.

Electronic device 200 may transmit the completion signal DONE to host 100 based on the detection signal DET and the condition signal COND (S335). Transmitting logic 220 may transmit the completion signal DONE to host 100 when both the detection signal DET and the condition signal COND are received. For example, transmitting logic 220 may receive the detection signal DET after receiving the condition signal COND and transmit the completion signal DONE to host 100 in response to receiving the condition signal COND. In another example, transmitting logic 220 may receive the condition signal COND after receiving the detection signal DET and transmit the completion signal DONE to host 100 in response to receiving the detection signal DET. In another example, transmitting logic 220 may receive the detection signal DET after receiving the condition signal COND, determine the signal transmission policy of host 100 based on the received detection signal DET, and transmit the completion signal DONE to host 100 according to the determined signal transmission policy of host 100. As described above, the duration of the full-duplex communication may be increased by variously changing the manner in which electronic device 200 transmits the completion signal DONE to host 100 according to the signal transmission policy of host 100.

Figure 6A:
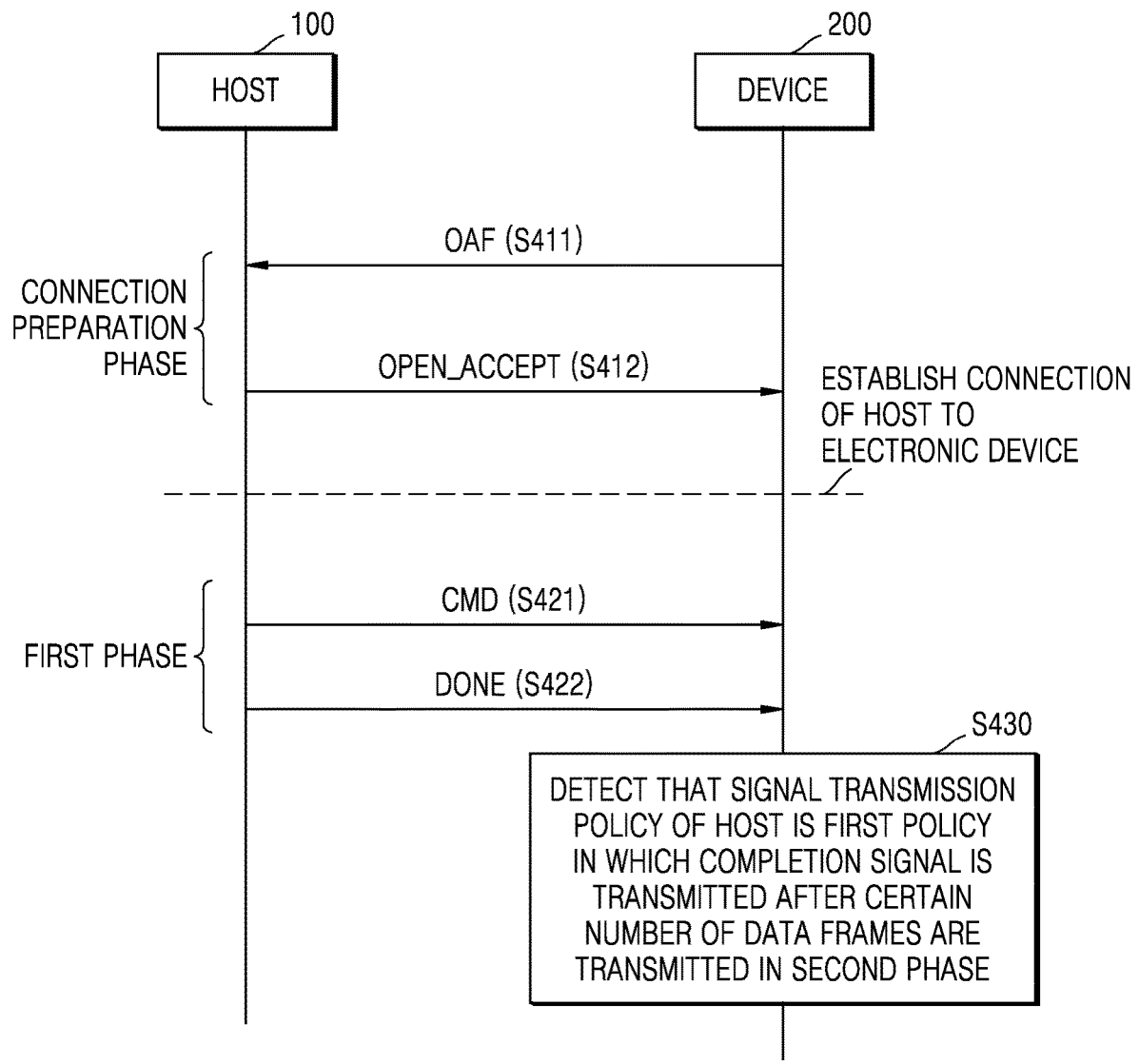
FIG. 6A is a flowchart of an operation of an electronic device detecting a first policy, according to an embodiment.

FIG. 6A is a flowchart of an operation of electronic device 200 detecting the first policy, according to an embodiment; FIG. 6B is a sequence diagram for explaining an operation of electronic device 200 transmitting the completion signal DONE according to the detected first policy, according to an embodiment; and FIG. 6C is a sequence diagram for explaining an operation of electronic device 200 transmitting the completion signal DONE after determining the signal transmission policy of host 100 as the first policy, according to an embodiment.

According to FIG. 6A, electronic device 200 may detect the signal transmission policy of host 100 as the first policy. Electronic device 200 may transmit to host 100 a connection request signal for establishing a connection of host 100 to electronic device 200 (S411). For example, the connection request signal may be an open address frame (OAF) according to the SAS protocol, and the OAF may include addresses of host 100 and electronic device 200.

Figure 7A:
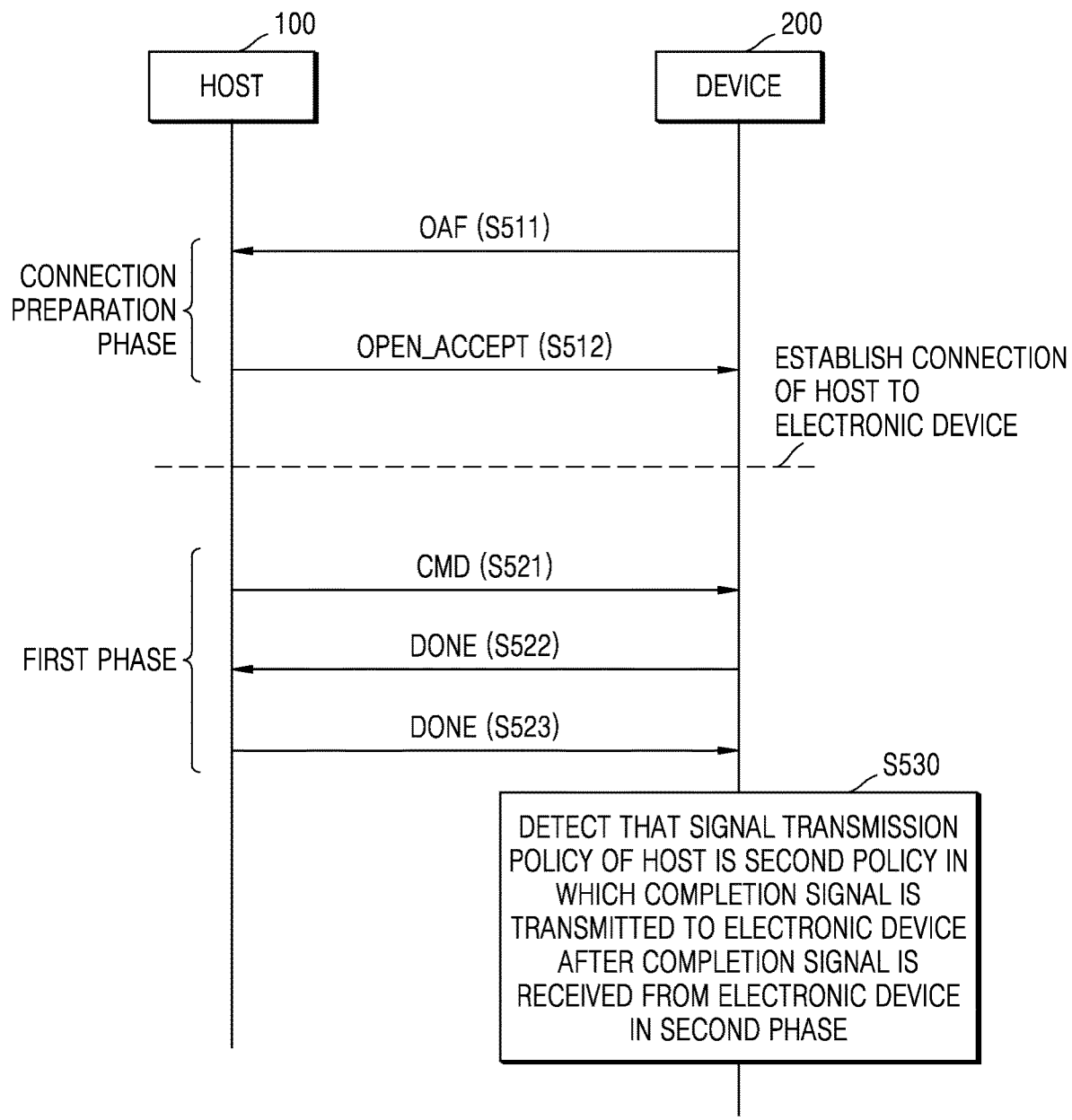
FIG. 7A is a flowchart of an operation of an electronic device detecting a second policy, according to an embodiment.

Host 100 may transmit a connection response signal in response to the received connection request signal (S412). For example, the connection response signal may be an open acceptance signal OPEN_ACCEPT according to the SAS protocol. In FIGS. 6A and 7A described below, it is illustrated that electronic device 200 transmits the connection request signal and host 100 transmits the connection response signal. However, to the contrary, host 100 may transmit the connection request signal, and electronic device 200 may transmit the connection response signal. On the other hand, as host 100 and electronic device 200 transmit the connection request signal and the connection response signal, a connection of host 100 to electronic device 200 may be established.

Host 100 may transmit the initial command signal CMD to electronic device 200 (S421). For example, host 100 may request various information such as a remaining capacity of electronic device 200 as host 100 transmits the initial command signal CMD, and electronic device 200 may respond to host 100 with the requested various information. The initial command signal CMD may, as described above, be a signal that is initially transmitted after the connection of host 100 to electronic device 200 is established.

Host 100 may transmit to electronic device 200 the completion signal DONE according to the initial command signal CMD (S422). For example, after transmitting the initial command signal CMD in the first phase, host 100 may transmit the completion signal DONE according to the initial command signal CMD to electronic device 200, regardless of whether host 100 receives the completion signal DONE from electronic device 200. For example, after transmitting the initial command signal CMD, host 100 may transmit the completion signal DONE according to the initial command signal CMD to electronic device 200 within a certain time. In this case, host 100 in the second phase may transmit the completion signal DONE after transmitting a certain number of data frames or a certain-sized data DTA.

When the signal transmission of host 100 is the first policy, host 100 may transmit the initial command signal CMD and the corresponding completion signal DONE regardless of whether the command signal CMD has been received as the completion signal DONE from electronic device 200. In addition, when the signal transmission policy of host 100 is the first policy, in the second phase, host 100 may transmit the completion signal DONE after transmitting the certain number of data frames or the certain-sized data DTA. Accordingly, electronic device 200 may detect the signal transmission policy of host 100 in the first phase immediately after the connection with host 100 is established.

Thus, by receiving the initial command signal CMD and the corresponding completion signal DONE transmitted from host 100 in the first phase, electronic device 200 may detect the signal transmission policy of host 100 as the first policy in which host 100 transmits the completion signal DONE after transmitting the certain number of data frames.

According to FIG. 6B, in the second phase, transmitting logic 220 of electronic device 200 may transmit the completion signal DONE to host 100 as transmitting logic 220 receives the condition signal COND and the detection signal DET.

Similar to the above, detecting logic 211 may detect the signal transmission policy of host 100 as the first policy (S430). Triggering logic 212 may transmit the condition signal COND to transmitting logic 220 (S440). In this case, the condition signal COND may include the first condition signal COND1 and the second conditional signal COND2. The condition signal COND may be a signal to request transmitting logic 220 to transmit the completion signal DONE to host 100.

After transmitting a series of data DTA, host 100 may transmit the completion signal DONE according to the transmitted data DTA to detecting logic 211 of electronic device 200 (S450). For example, when host 100 transmits the completion signal DONE to the various reception interfaces included in electronic device 200, the reception interface may transmit the completion signal DONE received from host 100 to detecting logic 211. In the second phase, host 100 may transmit and receive the data DTA to and from electronic device 200. In this case, after transmitting all data DTA to have been transmitted to electronic device 200, host 100 may transmit the completion signal DONE according to transmission of the data DTA.

After receiving the completion signal DONE, detecting logic 211 may generate the detection signal DET and transmit the detection signal DET to transmitting logic 220 (S460). When detecting logic 211 detects the signal transmission policy of host 100 as the first policy (S430) and receives the completion signal DONE (S450), detecting logic 211 may generate the detection signal DET and transmit the generated detection signal DET to transmitting logic 220 (S460).

After host 100 has sent the certain number of data frames and when host 100 transmits the completion signal DONE regardless of receiving the completion signal DONE from electronic device 200, it may be understood that the half-duplex communication is performed even though electronic device 200 does not transmit the completion signal DONE. Accordingly, when host 100 transmits the completion signal DONE (S450), detecting logic 211 may no longer perform the full-duplex communication, and thus, detecting logic 211 may transmit the detection signal DET to transmitting logic 220 such that transmitting logic 220 transmits the completion signal DONE (S480). In addition, by suspending the transmission of the detection signal DET until detecting logic 211 receives the completion signal DONE from host 100, the duration time of performing the full duplex communication between host 100 and electronic device 200 may be increased.

Transmitting logic 220 may receive the condition signal COND and the detection signal DET (S470) and transmit the completion signal DONE in response to receiving the condition signal COND and the detection signal DET (S480). For example, by receiving the condition COND and the detection signal DET as well as transmitting the completion signal DONE, transmitting logic 220 may complete a process of exchanging the data DTA between host 100 and electronic device 200. When transmitting logic 220 receives the detection signal DET together with at least one of the first condition signal COND1 and the second condition signal COND2, transmitting logic 220 may transmit the completion signal DONE. In addition, transmitting logic 220 may also be programmed to transmit the completion signal DONE to host 100 upon receipt of the detection signal DET and the condition signal COND.

According to FIG. 6C, in the second phase, transmitting logic 220 may determine the signal transmission policy of host 100 as the first policy and may transmit the completion signal DONE to host 100.

Detecting logic 211 may transmit the detection signal DET to transmitting logic 220 as detecting logic 211 detects the signal transmission policy of host 100 as the first policy. In this case, the detection signal DET may include information denoting that the signal transmission policy of host 100 is the first policy. Triggering logic 212 may transmit the condition signal COND to transmitting logic 220 (S451). On the other hand, operation S441 may be performed after operation S451 is performed.

Detecting logic 211 may determine the signal transmission policy of host 100 as the first policy based on the received detection signal DET (S461). In other words, transmitting logic 220 may determine the signal transmission policy of host 100, based on information included in the detection signal DET.

Host 100 may transmit the completion signal DONE to detecting logic 211, and detecting logic 211 may transmit the completion signal DONE to transmitting logic 220 (S471 and S472). In other words, the completion signal DONE transmitted by host 100 may be received by transmitting logic 220 via detecting logic 211. However, the embodiment is not limited thereto, and as various types of receiving interfaces included in electronic device 200 receive the completion signal DONE from host 100, and the receiving interfaces that have received the completion signal DONE transmit the completion signal DONE to transmitting logic 220, operations S471 and S472 may be performed instead.

transmitting logic 220 may receive the condition signal COND and the detection signal DET (S481) and transmit the completion signal DONE in response to receiving the condition signal COND and the detection signal DET (S491).

As described above, according to FIG. 6C, when electronic device 200 receives the completion signal DONE from host 100 (S471), transmitting logic 220 may determine the signal transmission policy of host 100 as the first policy in operation S461 to prepare to transmit the completion signal DONE to host 100 in response (S491). Accordingly, when the detection signal DET and the condition signal COND are received, by receiving the completion signal DONE from host 100 and then transmitting the completion signal DONE to host 100, transmitting logic 220 may reduce a delay required to complete a series of data communication processes.

FIG. 7A is a flowchart of an operation of electronic device 200 detecting the second policy, according to an embodiment, and FIG. 7B is a sequence diagram for explaining an operation of electronic system 10 transmitting the completion signal DONE, according to the detected second policy, according to an embodiment. Hereinafter, descriptions already given with reference to FIGS. 6A through 6C are omitted.

According to FIG. 7A, electronic device 200 may detect the signal transmission policy of host 100 as the second policy. Electronic device 200 may transmit to host 100 a connection request signal for establishing a connection of host 100 to electronic device 200 (S511). Host 100 may transmit a connection response signal in response to the received connection request signal (S512). For example, when electronic system 10 performs communication according to the SAS protocol, the connection request signal may be the OAF, and the connection response signal may be the open acceptance signal OPEN_ACCEPT.

Host 100 may transmit the initial command signal CMD to electronic device 200, and electronic device 200 may transmit information requested from host 100 to host 100 according to the initial command signal CMD (S521).

According to an embodiment, after transmitting the initial command signal CMD, host 100 may not transmit the completion signal DONE according to the initial command signal CMD to electronic device 200 within the certain time. When electronic device 200 does not receive the completion signal DONE according to the initial command signal CMD within the certain time after receiving the initial command signal CMD, electronic device 200 may perform operation S522, wherein electronic device 200 may transmit the completion signal DONE to host 100 (S522).

For example, after electronic device 200 transmits information requested through the initial command signal CMD or a series of data DTA to host 100, electronic device 200 may transmit the corresponding completion signal DONE to host 100.

Host 100 may transmit to electronic device 200 the completion signal DONE according to the initial command signal CMD (S523). For example, after transmitting the initial command signal CMD in the first phase, host 100 may transmit the completion signal DONE according to the initial command signal CMD to electronic device 200, depending on whether host 100 receives the completion signal DONE from electronic device 200. In other words, when the signal transmission policy of host 100 is the second policy, in the first phase and the second phase, host 100 may transmit the completion signal DONE to electronic device 200 after receiving the completion signal DONE from electronic device 200.

By transmitting the initial command signal CMD transmitted by host 100 in the first phase, and then transmitting the completion signal DONE, electronic device 200 may detect the signal transmission policy of host 100 as the second policy (S530). In other words, after host 100 transmits the completion signal DONE to electronic device 200 in the second phase also, electronic device 200 may detect the transmission of the completion signal DONE from host 100 through the communication process in the first phase. Thus, electronic device 200 may detect the signal transmission policy of host 100 as the second policy in which host 100 transmits the completion signal DONE to electronic device 200 after host 100 receives a completion signal DONE from electronic device 200.

According to FIG. 7B, in the second phase, transmitting logic 220 may transmit the completion signal DONE to host 100 as transmitting logic 220 receives the condition signal COND and the detection signal DET.

Similar to the above, detecting logic 211 may detect the signal transmission policy of host 100 as the second policy in which host 100 transmits the completion signal DONE to electronic device 200 after host 100 receives a completion signal DONE from electronic device 200 (S530). Detecting logic 211 may generate the detection signal DET and transmit the generated detection signal DET to transmitting logic 220, as detecting logic 211 detects the signal transmission policy of host 100 as the second policy (S540).

According to an embodiment, transmitting logic 220 may determine the signal transmission policy of host 100 as the second policy based on the received detection signal DET (S550). In this case, the detection signal DET may include information about the signal transmission policy of host 100. Based on the information included in the detection signal DET, transmitting logic 220 may determine the signal transmission policy of host 100 as the second policy. According to another embodiment, operation S550 may be omitted. Transmitting logic 220 may also be programmed to transmit the completion signal DONE to host 100 upon receipt of both of the detection signal DET and the condition signal COND. In this case, transmitting logic 220 may not need to determine the signal transmission policy of host 100 and reduce the processing time thereof.

Triggering logic 212 may transmit the condition signal COND to transmitting logic 220 (S560). As described above, the condition signal COND may include the first condition signal COND1 and the second condition signal COND2 that are respectively generated by first sub-triggering logic 213 and second sub-triggering logic 214. On the other hand, the order of the operations S560 and S540 may be changed. In other words, electronic device 200 may perform operations in the order of operations S560, S540, and S550.

Transmitting logic 220 may receive the condition signal COND and the detection signal DET (S570) and transmit the completion signal DONE based on receiving the condition signal COND and the detection signal DET (S580).

Although not illustrated, after electronic device 200 transmits the data DTA in the second phase, electronic device 200 may transmit the completion signal DONE according to the transmitted data DTA. Host 100 may transmit the completion signal DONE to electronic device 200 (S590) by, or in response to, receiving the completion signal DONE according to the data DTA transmitted by electronic device 200 (S580). This may be because the signal transmission policy of host 100 is the second policy.

Figure 8A:
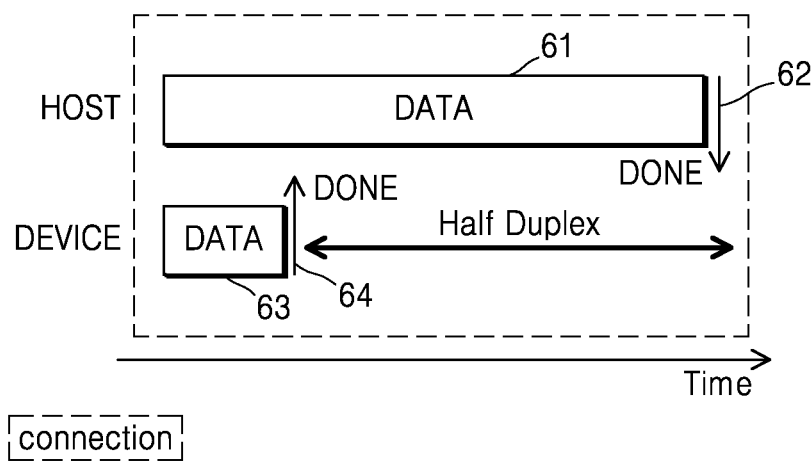
FIG. 8A is a data flowchart of a data transmission method of an electronic system when a signal transmission policy of a host is a first policy, according to an embodiment.
Figure 8B:
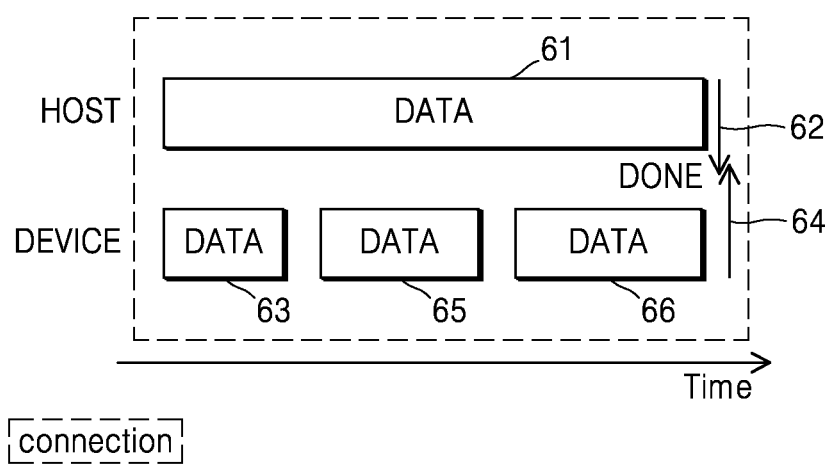
FIG. 8B is diagram for explaining a data transmission method of an electronic system when a signal transmission policy of a host is a first policy, according to an embodiment.

FIG. 8A is a data flowchart of a data transmission method of electronic system 10 when the signal transmission policy of host 100 is the first policy, according to an embodiment, and FIG. 8B is a diagram for explaining a data transmission method of electronic system 10 when the signal transmission policy of host 100 is the first policy, according to an embodiment.

Referring to FIG. 8A, when the signal transmission policy of host 100 is the first policy, after the connection of host 100 to the electronic device 200 is established, the host 100 may transmit data 61 and thereafter completion signal 62 to electronic device 200. In an example, data 61 may include a certain number of data frames, and in another example, data 61 may be data having a certain size (for example, the number of bits). In this case, when electronic device 200 in a general configuration transmits a completion signal 64 regardless of whether electronic device 200 has received a completion signal 62 from host 100 after transmitting data 63, an interval may occur in which the half-duplex communication is performed from a time point at which completion signal 64 is transmitted to host 100 to a time point at which completion signal 62 is received from host 100.

Referring to FIG. 8B, electronic device 200 may perform an operation method according to an embodiment. After host 100 transmits data 61, in response to transmitting the corresponding completion signal 62 by host 100, electronic device 200 may transmit the completion signal 64. To perform communication, not as illustrated in FIG. 8A in which electronic device 200 transmits completion signal 64 after transmitting data 63, but as illustrated in FIG. 8B in which electronic device 200 transmits completion signal 64 to host 100 after receiving completion signal 62, electronic device 200 may include detecting logic 211, triggering logic 212, and transmitting logic 220. Accordingly, as the interval in which the half-duplex communication is performed is reduced, electronic device 200 may transmit more of data 65 and data 66, and thus, the amount of data transmission and the data transmission efficiency may be increased.

Figure 9A:
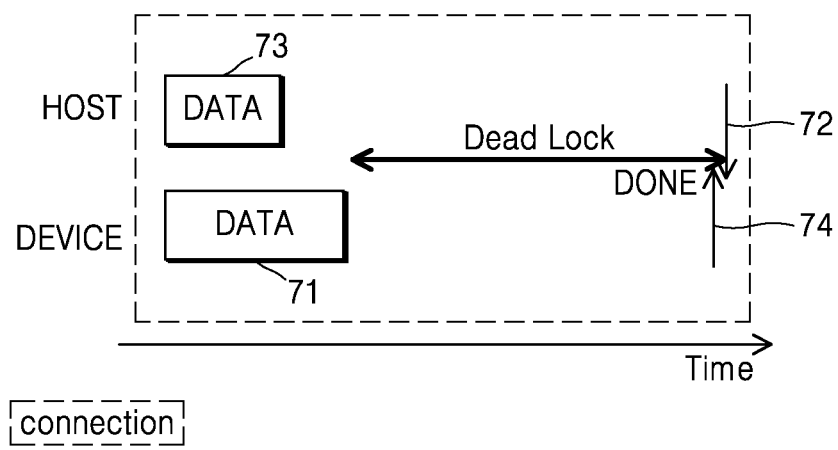
FIGS. 9A and 9B are data flowcharts of data transmission methods of an electronic system when a signal transmission policy of a host is a second policy, according to embodiments, respectively.
Figure 9B:
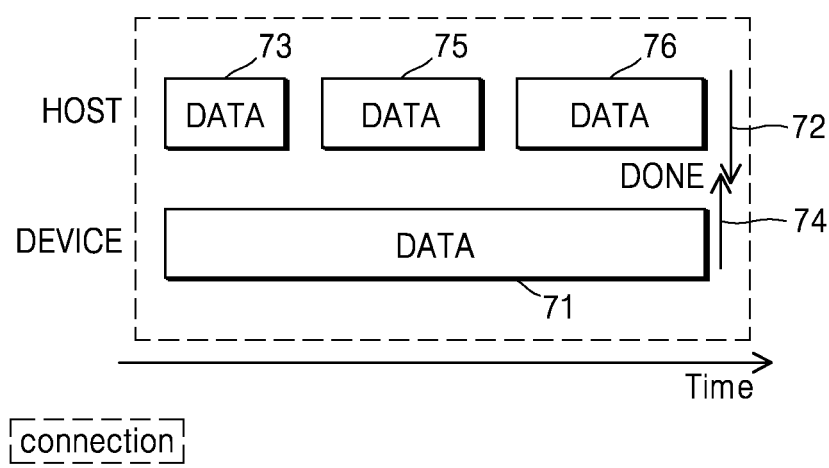

FIGS. 9A and 9B are data flowcharts of data transmission methods of electronic system 10 when the signal transmission policy of host 100 is the second policy, according to embodiments, respectively.

Referring to FIG. 9A, after electronic device 200 determines the signal transmission policy of host 100 as the first policy, the signal transmission policy of host 100 may be changed to the second policy due to various causes such as a physical cause in host 100 changed by a user, a change in software (for example, a change in the signal transmission policy of host 100 by the user). Even in this case, when electronic device 200 operates by mistakenly assuming that host 100 uses still the first policy, a malfunction (for example a dead lock) may occur where neither host 100 nor electronic device 200 transmits the completion signal DONE.

Referring to FIG. 9B, according to an embodiment, electronic device 200 may detect that host 100 transmits a completion signal 72, only after host 100 receives data 71 and a corresponding completion signal 74. In other words, in the first phase, electronic device 200 may detect in advance that the signal transmission policy of host 100 is the second policy, and in the second phase, electronic device 200 may transmit completion signal 74 based on the detection signal DET and the condition signal COND, regardless of receiving completion signal 72 from host 100. Descriptions thereof have been already given with reference to FIGS. 7A and 7B, and thus are omitted here.

Figure 10A:
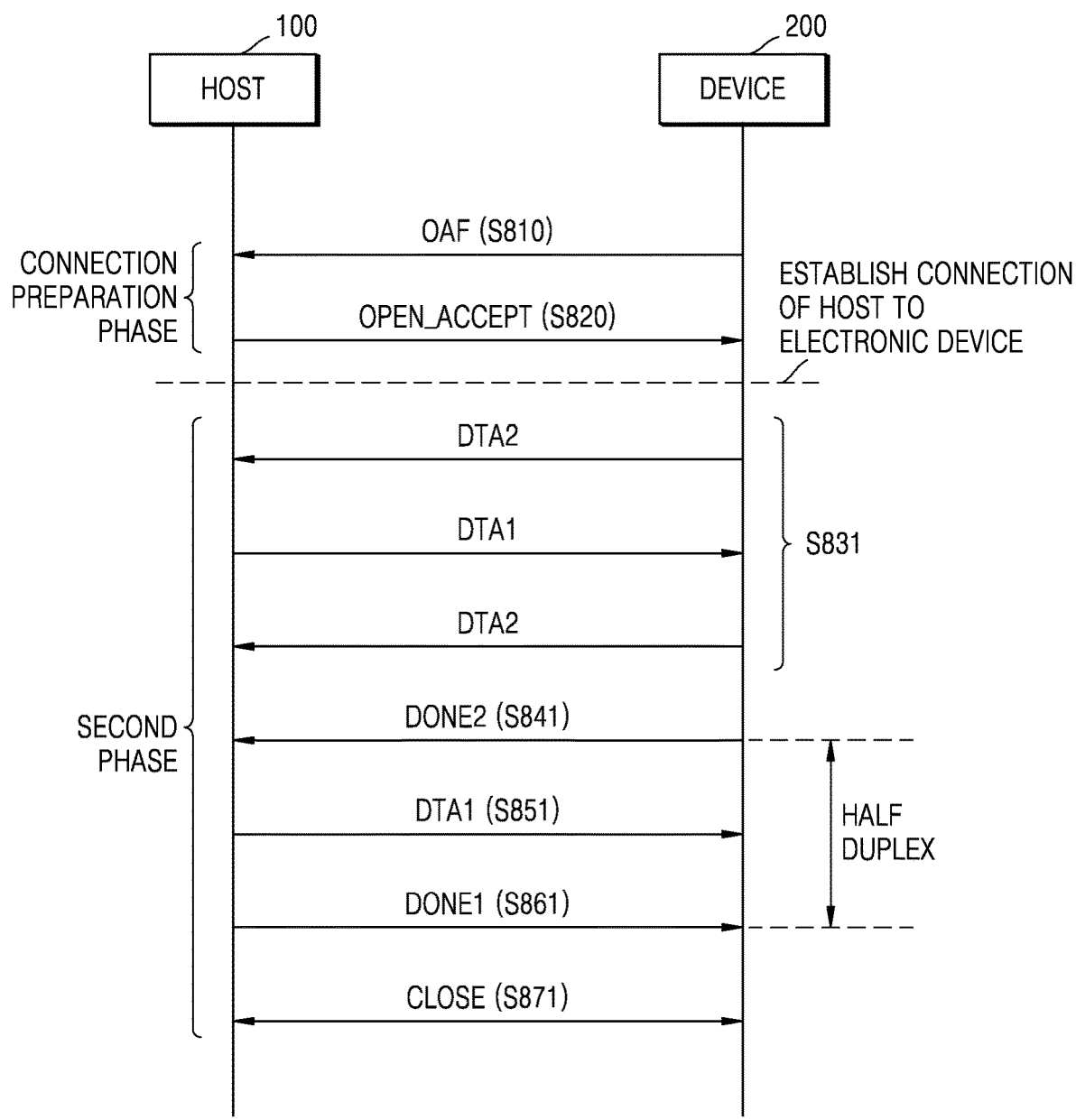
FIGS. 10A and 10B are sequence diagrams for explaining data transmission methods of an electronic system when a signal transmission policy of a host is a first policy, according to embodiments, respectively.
Figure 10B:
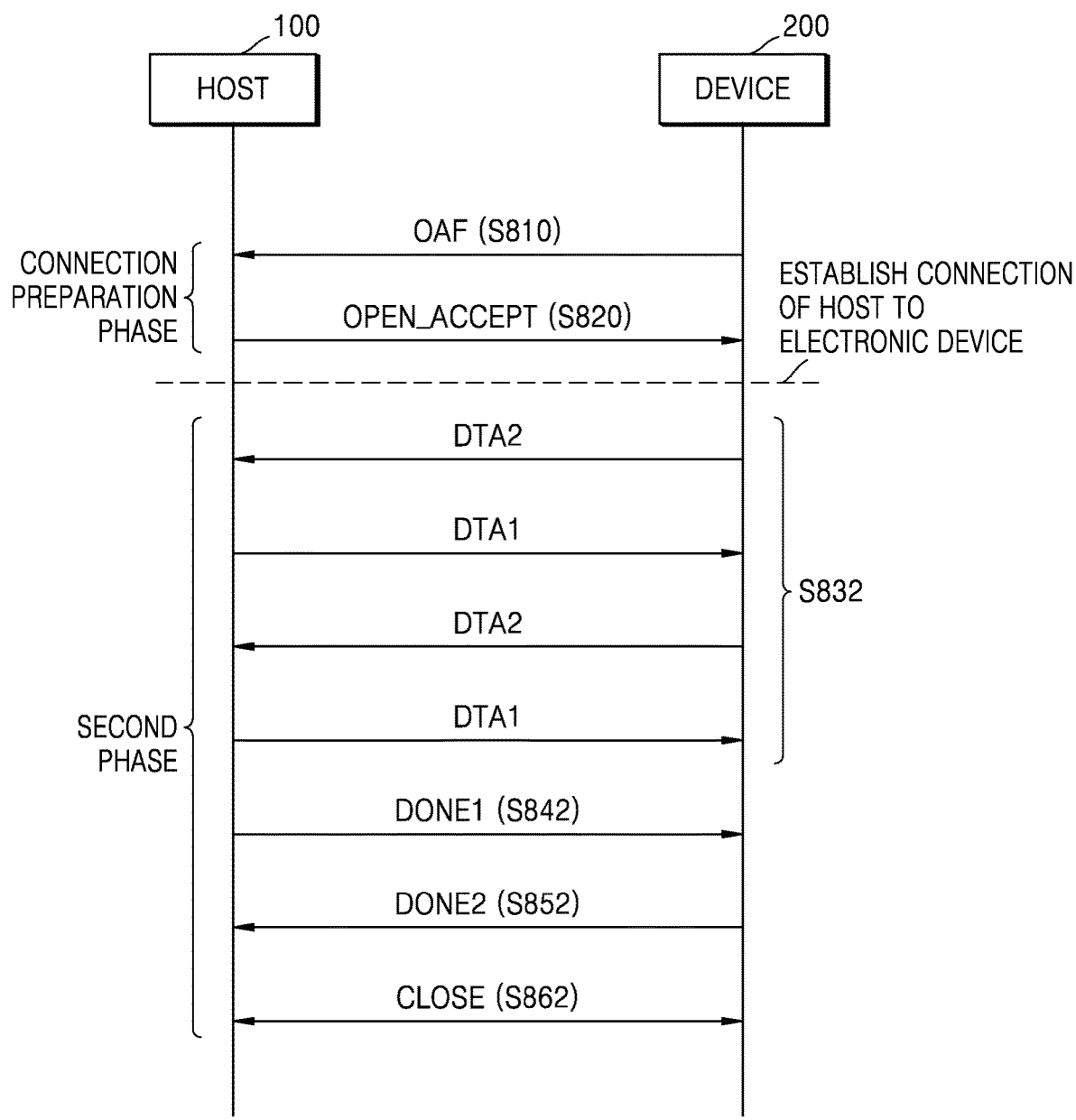

FIGS. 10A and 10B are sequence diagrams for explaining data transmission methods of electronic system 10 when the signal transmission policy of host 100 is the first policy, according to embodiments, respectively.

Referring to FIG. 10A, similar to that described above in FIG. 8A, electronic system 10 may have a half-duplex communication interval in a certain time period. For example, in a connection preparation phase, host 100 and electronic device 200 may transmit the connection request signal and the connection response signal, respectively (S810 and S820). In the second phase of exchanging data, host 100 may transmit a first data DTA1 to electronic device 200, and electronic device 200 may transmit a second data DTA2 to host 100 (S831).

Electronic device 200 may transmit a second completion signal DONE2 to host 100 (S841). After transmitting the second completion signal DONE2, although the second data DTA to be transmitted to host 100 by electronic device 200 due to various causes may occur, the second data DTA2 may not be transmitted. In other words, only host 100 included in electronic system 10 may transmit the first data DTA1, and electronic device 200 may perform the half-duplex communication in which the second data DTA2 cannot be transferred any more. Host 100 may transmit the first completion signal DONE1 after all the certain number of data frames have been transmitted (S861), and by exchanging connection end signals, the established connection of host 100 to electronic device 200 may be terminated (S871).

According to FIG. 10B, similar to that described above with reference to FIG. 8B, the half-duplex communication interval of the electronic system 10 may be reduced. For example, in a connection preparation phase, host 100 and electronic device 200 may transmit the connection request signal and the connection response signal, respectively (S810 and S820). In the second phase of exchanging data, host 100 may transmit a first data DTA1 to electronic device 200, and electronic device 200 may transmit a second data DTA2 to host 100 (S832).

Host 100 may transmit the first completion signal DONE1 to electronic device 200 (S842). Electronic device 200 may transmit the second completion signal DONE2 after receiving the first completion signal DONE1 from host 100 (S852).

Compared with the content in FIG. 10A, electronic device 200 may maintain the full-duplex communication method like operation S832 as long as possible to increase the data transmission efficiency, until electronic device 200 receives the first completion signal DONE1. In other words, according to an embodiment, electronic device 200 may detect the signal transmission policy of host 100 as the first policy in the first phase, and only after receiving the first completion signal in the second phase (S842), electronic device 200 may transmit the second completion signal (S852).

By exchanging the connection end signals, host 100 and electronic device 200 may terminate the established connection (S862). For example, the connection end signal may include a close signal CLOSE according to the SAS protocol. The first completion signal DONE1 may denote the completion signal that host 100 transmits to electronic device 200, and the second completion signal DONE2 may denote the completion that electronic device 200 transmits to host 100. In addition, the first completion signal DONE1 may be the completion signal DONE according to transmission of the first data DTA1, and the second completion signal DONE2 may be the completion signal DONE2 according to transmission of the second data DTA2.

Figure 11:
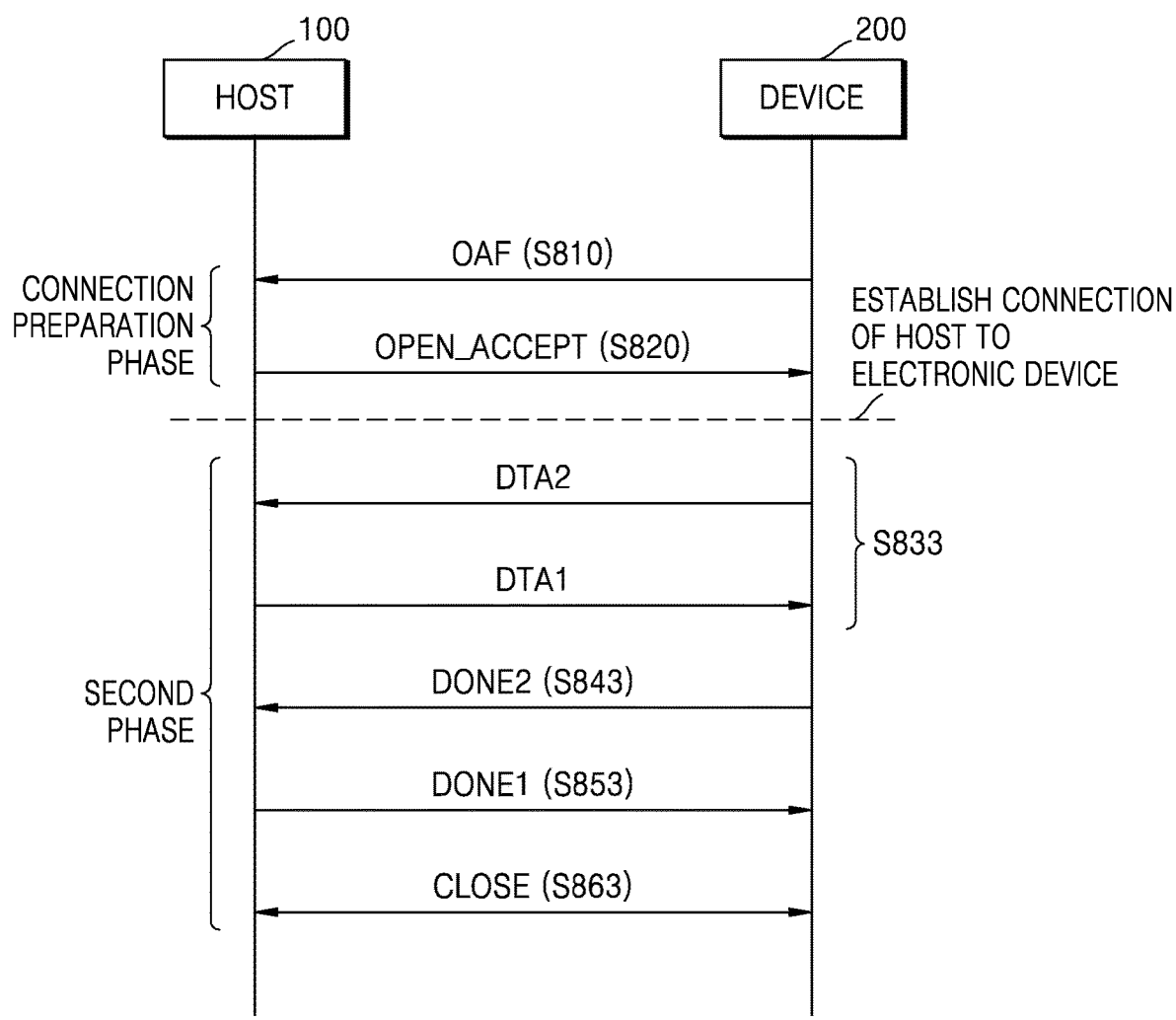
FIG. 11 is a sequence diagram for explaining a data transmission method of an electronic system when a signal transmission policy of a host is a second policy, according to an embodiment.

FIG. 11 is a sequence diagram for explaining a data transmission method of electronic system 10 when the signal transmission policy of host 100 is the second policy, according to an embodiment. Descriptions already given with reference to FIGS. 10A and 10B may be omitted.

Referring to FIG. 11, in the connection preparation phase, host 100 and electronic device 200 may transmit the connection request signal and the connection response signal, respectively (S810 and S820). In the second phase of exchanging data, host 100 may transmit a first data DTA1 to electronic device 200, and electronic device 200 may transmit a second data DTA2 to host 100 (S833).

Electronic device 200 may transmit the second completion signal DONE2 to the host 100 (S843). According to an embodiment, when transmitting logic 220 included in electronic device 200 receives the detection signal DET and the condition signal COND, to determine the signal transmission policy of host 100 as the second policy and to prevent the deadlock between host 100 and electronic device 200, electronic device 200 may transmit the second completion signal DONE2 regardless of receiving the completion signal DONE from host 100.

Since the signal transmission policy of host 100 is the second policy, host 100 may transmit the first completion signal DONE1 in response to receiving the second completion signal DONE2 (S853).

By exchanging the connection end signals, host 100 and electronic device 200 may terminate the established connection (S863).

Figure 12:
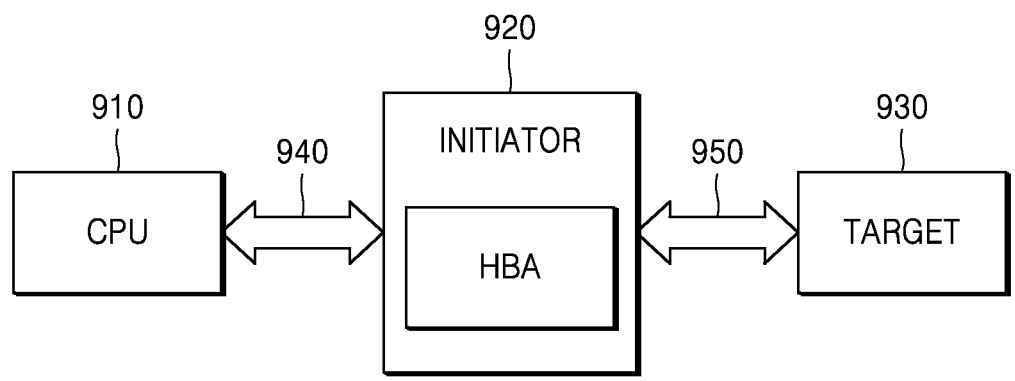
FIG. 12 is a block diagram for explaining an electronic system according to an embodiment.

FIG. 12 is a block diagram for explaining an electronic system 20 according to an embodiment.

Referring to FIG. 12, electronic system 20 may include a central processing unit (CPU) 910, an initiator 920, a target 930, a bus 940 between CPU 910 and initiator 920, and a bus 950 between initiator 920 and target 930. CPU 910 may perform an overall control of electronic system 20 and may be implemented by an application processor (AP). Initiator 920 and target 930 may include various end devices which communicate through the SAS protocol, and initiator 920 may include a host bus adapter (HBA). Target 930 may be implemented with various magnetic field devices and may be implemented, for example, by a solid state drive (SSD). Bus 950 may be implemented to communicate through the SAS protocol. Initiator 920 may be implemented by host 100 described above, and target 930 may be implemented by electronic device 200 described above. Alternatively, target 930 may be implemented by host 100, and initiator 920 may be implemented by electronic device 200. For example, target 930 may determine the signal transmission policy of initiator 920, and differently transmit the completion signal DONE to initiator 920 via bus 950 for each of the first policy and the second policy.

According to an electronic device and an operating method of the same according to example embodiments, by detecting a signal transmission method of a host, the electronic device may perform data communication with the host through a full duplex communication and thus increase the efficiency of data transmission.

The various operations of methods described above may be performed by any suitable means capable of performing the operations, such as various hardware and/or software component(s), circuits, and/or module(s).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

As described above, embodiments have been disclosed in the drawings and the specification. While the embodiments have been described herein with reference to specific terms, it should be understood that they have been used only for the purpose of describing the technical idea of the inventive concept and not for limiting the scope of the inventive concept as defined in the claims. Thus, those with ordinary skill in the art will appreciate that various modifications and equivalent embodiments are possible without departing from the scope of the inventive concept. Accordingly, the true scope of protection of the inventive concept should be determined by the technical idea of the following claims.

What is claimed is:

1. An electronic device configured to communicate with a host, the electronic device comprising:
   a detecting logic configured to
      receive from the host, after a connection of the host to the electronic device is established, an initial command signal and a first completion signal, and
      detect a signal transmission policy of the host based on a relationship between timing of receiving the first completion signal from the host and timing of transmitting a second completion signal to the host, and generate a detection signal based on the detected signal transmission policy of the host,
      wherein the initial command signal is the first signal transmitted from the host to the electronic device after the connection of the host to the electronic device is established,
      wherein the first completion signal is transmitted from the host to the electronic device in response to the initial command signal,
      wherein the second completion signal is transmitted from the electronic device to the host in response to the initial command signal; and
   a transmitting logic configured to transmit a third completion signal to the host based on the detection signal,
      wherein the third completion signal indicates that the electronic device has completed transmitting to the host all of specified information.

2. The electronic device of claim 1,
   wherein the detecting logic transmits the detection signal to the transmitting logic when the signal transmission policy of the host is detected, and
   wherein the detection signal includes information about the signal transmission policy of the host.

3. The electronic device of claim 1,
   wherein the detecting logic detect a signal transmission policy of the host as a first policy when the timing of receiving the first completion signal from the host is faster than the timing of transmitting the second completion signal to the host, and detect a signal transmission policy of the host as a second policy when the timing of transmitting the second completion signal to the host is faster than the timing of receiving the first completion signal from the host.

4. The electronic device of claim 3,
   wherein the transmitting logic transmits the third completion signal to the host after the host transmits a forth completion signal to the detecting logic, when the signal transmission policy of the host is detected as the first policy,
      wherein the forth completion signal indicates that the host has completed transmitting to the electronic device all of the specified information.

5. The electronic device of claim 3,
   wherein the transmitting logic transmits the third completion signal to the host before the host transmits a forth completion signal to the detecting logic, when the signal transmission policy of the host is detected as the second policy,
      wherein the forth completion signal indicates that the host has completed transmitting to the electronic device all of the specified information.

6. The electronic device of claim 1,
   wherein the electronic device is configured to transmit one or more data frames to the host, and further comprises a triggering logic transmitting to the transmitting logic a condition signal which differs depending on whether there is a remaining data frame to be transmitted to the host, and
   wherein the transmitting logic is configured to transmit the third completion signal to the host in response to receiving both the detection signal and the condition signal.

7. The electronic device of claim 6,
   wherein the condition signal comprises a first condition signal and a second condition signal, and wherein the triggering logic transmits the first condition signal to the transmitting logic when there is the remaining data frame to be transmitted, and the triggering logic transmits the second condition signal to the transmitting logic when there is no remaining data frame to be transmitted.

8. An electronic device configured to communicate with a host and transmit one or more data frames to the host, the electronic device comprising:
a detecting logic configured to receive an initial command signal and a first completion signal from the host in response to the initial command signal, and transmit a second completion signal to the host in response to the initial command signal, and detect a signal transmission policy of the host based on a timing of receiving the first completion signal and a timing of transmitting the second completion signal, and generate a detection signal including information about the signal transmission policy of the host,
wherein the initial command signal is the first signal transmitted from the host to the electronic device after a connection of the host to the electronic device is established;
a triggering logic configured to generate a condition signal which differs depending on whether there is a remaining data frame to be transmitted to the host; and
a transmitting logic configured to transmit a third completion signal to the host based on the detection signal, wherein the third completion signal indicates that the electronic device has completed transmitting to the host all of specified information.

9. The electronic device of claim 8,
wherein the detecting logic detect a signal transmission policy of the host as a first policy when the timing of receiving the first completion signal from the host is faster than the timing of transmitting the second completion signal to the host, and detect a signal transmission policy of the host as a second policy when the timing of transmitting the second completion signal to the host is faster than the timing of receiving the first completion signal from the host.

10. The electronic device of claim 9,
wherein the transmitting logic transmits the third completion signal to the host after the host transmits a forth completion signal to the detecting logic, when the signal transmission policy of the host is detected as the first policy,
wherein the forth completion signal indicates that the host has completed transmitting to the electronic device all of the specified information.

11. The electronic device of claim 9,
wherein the transmitting logic transmits the third completion signal to the host before the host transmits a forth completion signal to the detecting logic, when the signal transmission policy of the host is detected as the second policy,
wherein the forth completion signal indicates that the host has completed transmitting to the electronic device all of the specified information.

12. The electronic device of claim 8,
wherein the triggering logic comprises a first sub-triggering logic and a second sub-triggering logic,
wherein the first sub-triggering logic generates a first condition signal requesting the transmitting logic to transmit the third completion signal to the host even though electronic device includes remaining data to be transmitted, and
wherein the second sub-triggering logic generates a second condition signal requesting the transmitting logic to transmit the third completion signal to the host when there remains no data to be transmitted by electronic device.

13. The electronic device of claim 12,
wherein the first sub-triggering logic implemented with firmware, and
wherein the second sub-triggering logic implemented with a link state machine.

14. The electronic device of claim 12,
wherein the transmitting logic transmit a forth completion signal to the host after the transmitting logic receives at least one of the first condition signal and the second condition signal, and the detection signal,
wherein the forth completion signal is independent of the third completion signal and indicates that the host has completed transmitting to the electronic device all of the specified information.

15. An operation method of an electronic device configured to communicate with a host, the operation method comprising:
in a first phase, detecting a signal transmission policy of the host by the electronic device as a second policy when the host transmits to the electronic device a first completion signal after the electronic device transmits to the host a second completion signal corresponding to a initial command signal,
wherein the initial command signal is the first signal transmitted from the host to the electronic device after a connection between the host and the electronic device is established,
wherein the first completion signal is delayed for a certain time after the initial command signal is transmitted from the host to the electronic device,
wherein the second completion signal is transmitted from the electronic device to the host when the first completion signal is not received from the host within the certain time after receiving the initial command signal,
in a second phase, transmitting a third completion signal from the electronic device to the host after the electronic device transmits at least one data frames to the host according to second policy detected by the electronic device, wherein the third completion signal indicates that the electronic device has completed transmitting the at least one data frames to the host; and
in the second phase, transmitting a forth completion signal from the host to the electronic device after the host receives the third completion signal from the electronic device according to second policy detected by the electronic device, wherein the forth completion signal indicates that the host has completed transmitting the at least one data frames to the electronic device.

16. The operation method of claim 15, further comprising generating a detection signal including information about the signal transmission policy of the host in the second phase.

17. The operation method of claim 16, further comprising generating a condition signal requesting the electronic device to transmit the third completion signal to the host in the second phase, and
transmitting the third completion signal based on the detection signal and the condition signal.

18. The operation method of claim 17, wherein generating a condition signal includes generating a first condition signal requesting the electronic device to transmit the third completion signal to the host even though electronic device includes remaining data to be transmitted; and generating a second condition signal requesting the electronic device to transmit the third completion signal to the host when there remains no data to be transmitted by electronic device.

19. The operation method of claim 15, wherein the forth completion signal is independent of the third completion signal.

20. The operation method of claim 15, further comprising detecting the signal transmission policy of the host as a first policy different from the second policy by electronic device when the electronic device receives sequentially from the host an initial command signal followed by a first completion signal corresponding to the initial command signal in the first phase.

\* \* \* \* \*